May 8, 1956      A. D. SIMPSON      2,744,591
DEVICE FOR PREVENTING LEAKAGE AROUND FASTENER HEADS
Filed Feb. 7, 1951      3 Sheets—Sheet 1
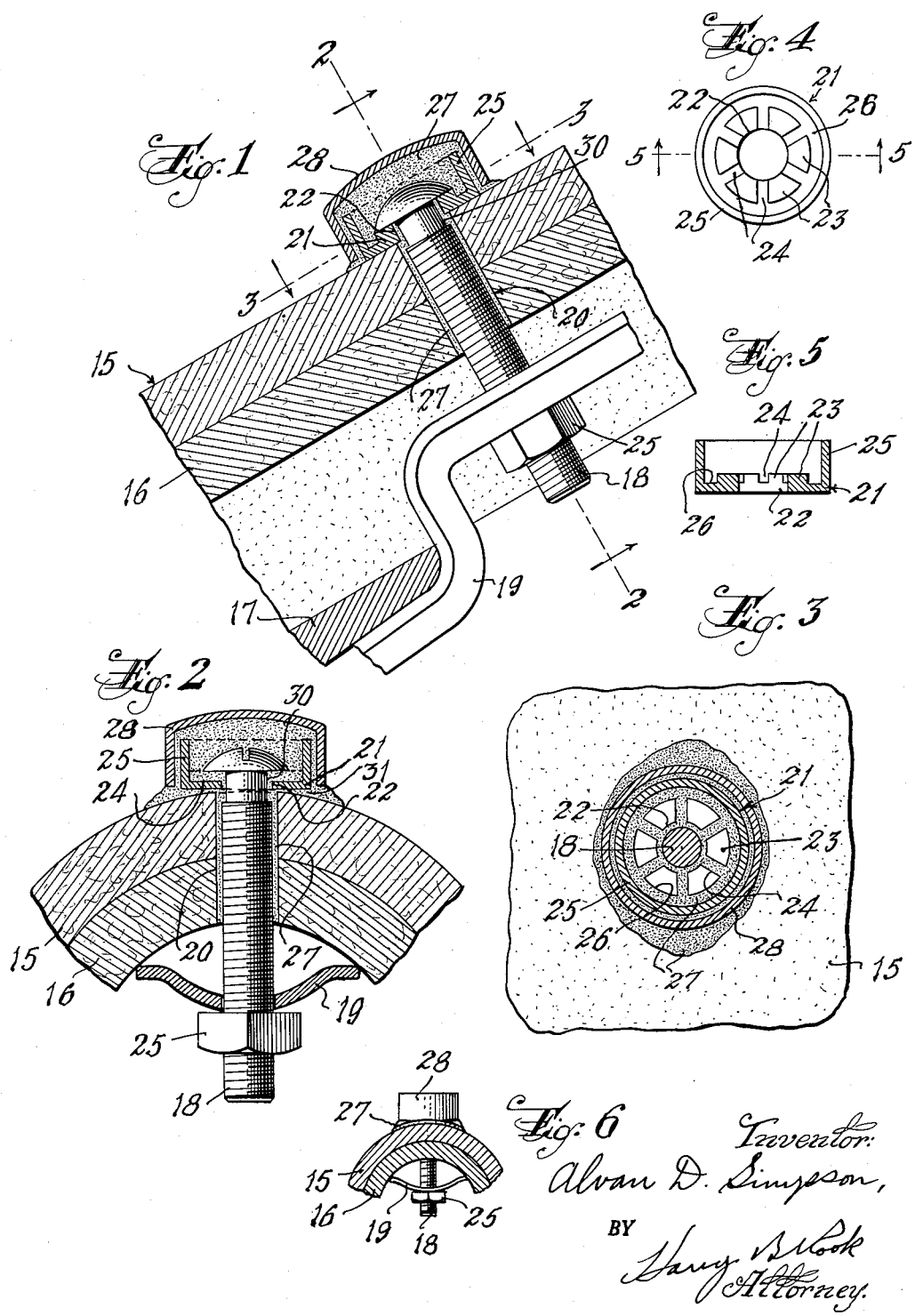

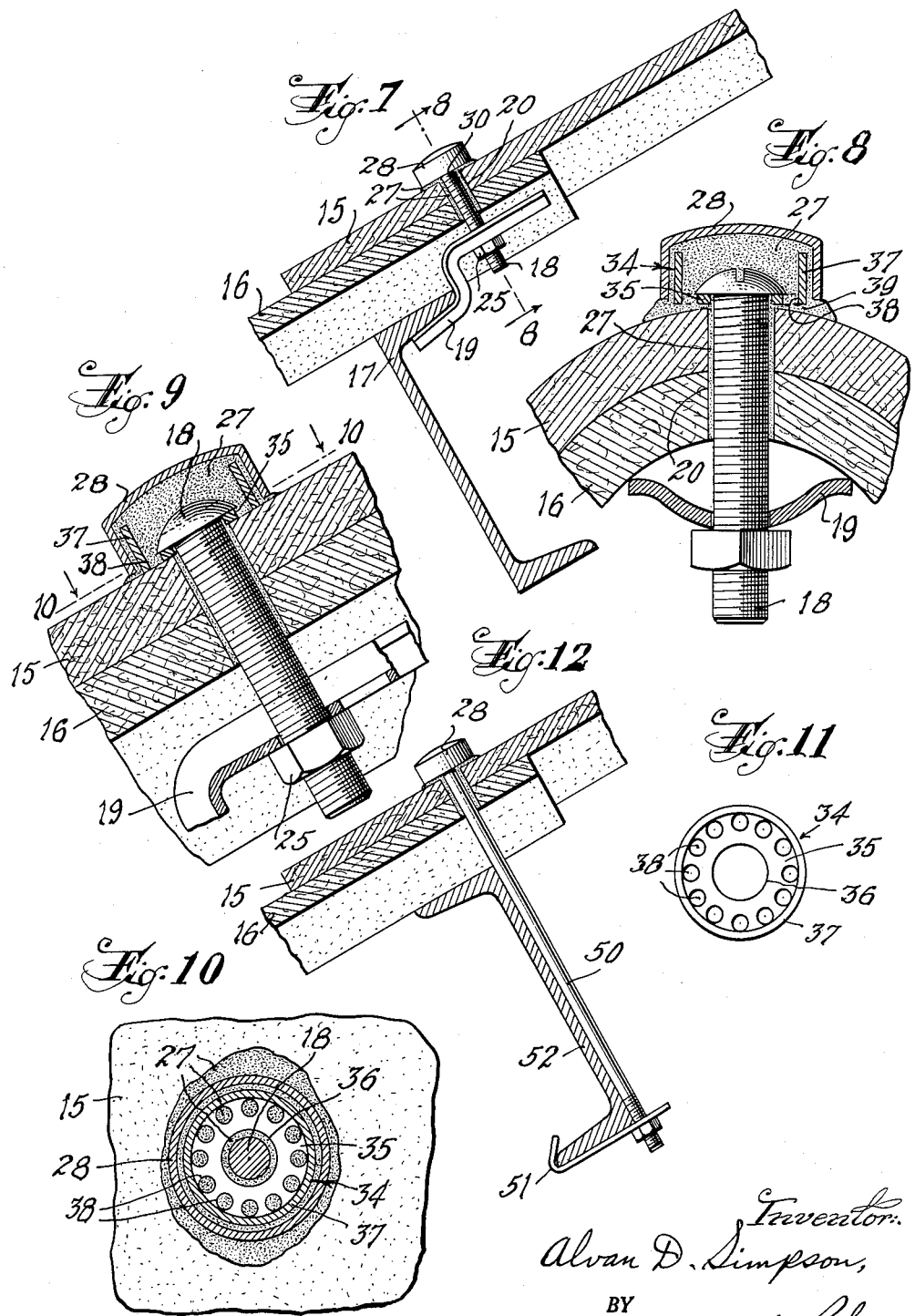

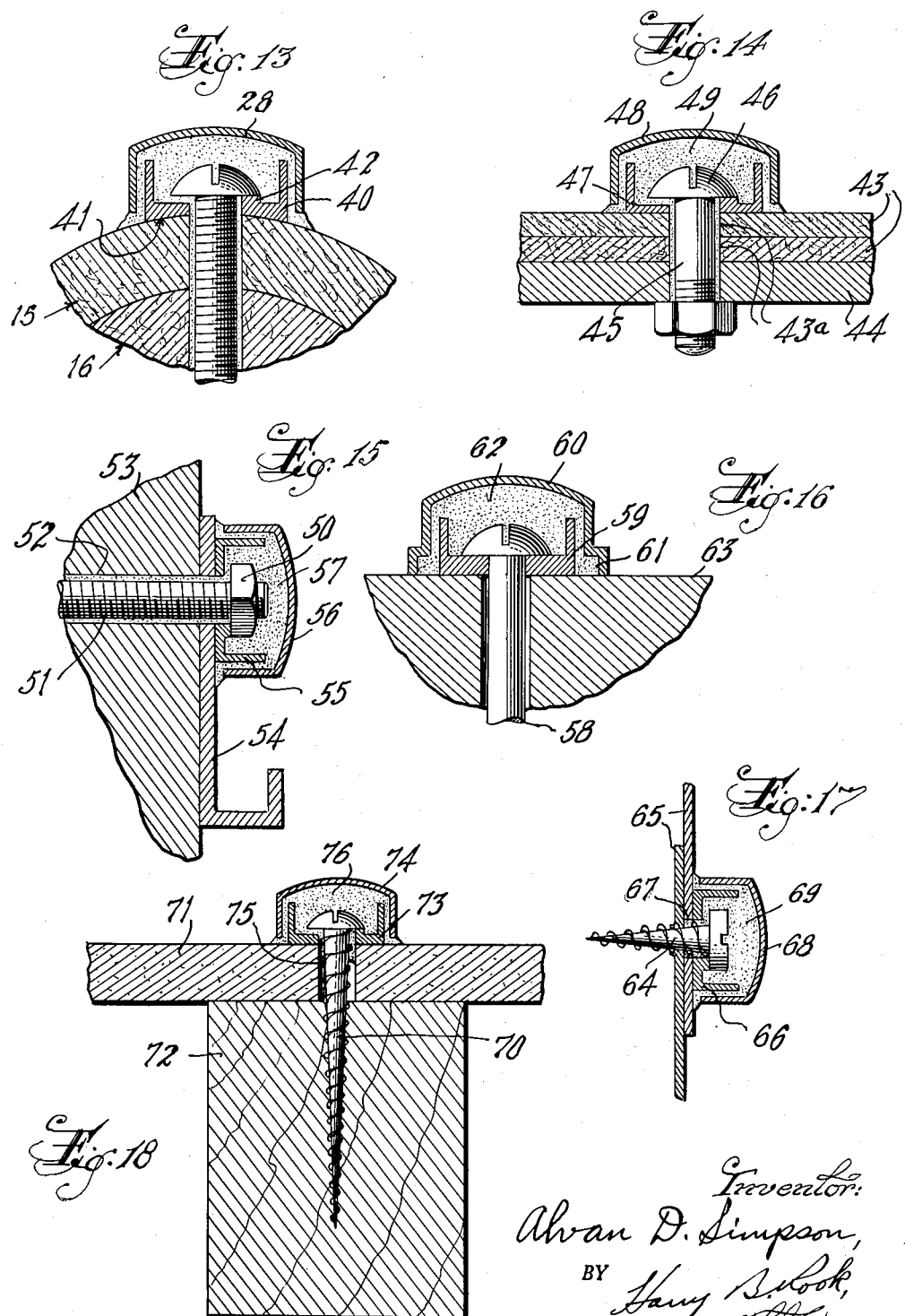

United States Patent Office 2,744,591
Patented May 8, 1956

2,744,591

DEVICE FOR PREVENTING LEAKAGE AROUND FASTENER HEADS

Alvan D. Simpson, Plainfield, N. J., assignor to The Forming Machine Company of America, Bound Brook, N. J., a corporation of Delaware Application February 7, 1951, Serial No. 209,858

7 Claims. (Cl. 189—36)

This invention relates in general to headed fasteners having shanks inserted through openings in other parts; and more particularly the invention is concerned with fasteners used to secure sheets of material, such as metal or asbestos sheets, either flat or corrugated, to wood or metal framework or sheathing sub-structure or to each other.

Lead washers have been used to prevent leakage around such fasteners but have not proven satisfactory because either the fasteners have not been capable of exerting sufficient pressure on the lead to make the seal or the fasteners have been tightened to such a degree as to crush the lead washer; and furthermore the soft lead will permit the fastener to loosen when subjected to considerable vibration and the lead washers cannot enter the space between the shank of the fastener and the hole in which the shank is located. Moreover, to protect the soft lead, frequently a steel washer has been interposed between the head of the fastener and the lead washer, but the steel washer prevents the lead washer from making a satisfactory seal.

Other attempts have been made to make the desired seal by covering the heads of the fasteners with putty of various types, but the putty being subjected to weather conditions, dries out and cracks and sometimes drops off or is knocked off particularly by ice or snow slides.

A prime object of the invention is to provide novel and improved means preventing leakage around the fastener head and for completely sealing the space between the fastener and the hole in which the shank of the fastener is located.

Another object is to provide a sealing device for a fastener of the type including a shank and a head or a threaded shank and a nut so that the head or nut of the fastener can be completely covered with a sealing composition, said sealing composition can be forced into the hole in which the fastener shank is located and said sealing composition can be covered or enclosed, thereby to prevent leakage of fluid around the fastener into said hole, to protect the head of the fastener from erosion and to preserve the sealing composition against atmospheric conditions that might cause drying or other deterioration of said composition.

A further object is to provide a sealing device of the character described comprising a cup-shaped base having an opening through which the fastener shank may loosely pass, and a cup-shaped cap associated with the base to receive a plastic sealing composition between them, said base being constructed to provide for passage of the sealing composition outwardly from said base into surrounding relation to the fastener head and into the space between the fastener shank and the wall of the opening in which said shank is located.

Other objects are to provide such a sealing device which shall be simple and inexpensive in construction and which shall include a minimum number of parts whereby the installation of the fastener and the sealing device shall be economical; and to obtain other advantages and results that will be brought out by the following description in conjunction with the accompanying drawings in which Figure 1 is a cross-sectional view of a portion of a corrugated sheet roof structure with a fastener constructed in accordance with the invention;

Figures 2 and 3 are sectional views taken on line 2—2 and 3—3, respectively, of Figure 1;

Figure 4 is a top plan view of the washer used in the embodiment illustrated in Figure 1;

Figure 5 is a section taken on the line 5—5 of Figure 4;

Figure 6 is a view similar to that of Figure 2 but showing the fastener in elevation rather than partly in section;

Figure 7 represents a cross-section of a portion of a corrugated sheet roof structure with the fastener shown in elevation;

Figure 8 is a sectional view taken on line 8—8 of Figure 7, and illustrating another embodiment of the washer that may be used in accordance with the invention;

Figure 9 is a view similar to Figure 8 but taken on a plan perpendicular to the plane of Figure 8;

Figure 10 is a sectional view taken on line 10—10 of Figure 9;

Figure 11 is a top plan view of the washer illustrated in Figures 8, 9 and 10;

Figure 12 is a view similar to Figure 7 but illustrating the adaptation of the invention to a J-clip support;

Figure 13 is a fragmentary view similar to Figure 2 showing a modification of the base of the sealing device;

Figure 14 is a fragmentary view similar to Figure 2 showing another use of the sealing device at the head of a fastener on the outside view of a flat sheet;

Figure 15 is a similar view showing the invention utilized for sealing the nut, instead of the head, of a fastener and also for sealing the hole in a wall in which the fastener is inserted;

Figure 16 is a similar view showing a modification of the sealing device for use with a bolt for sustaining heavy pressure, the seal being produced only at the outer edge of the base;

Figure 17 is a transverse vertical sectional view showing the sealing device in conjunction with a sheet metal screw for securing two metal sheets together; and Figure 18 is a similar view showing the sealing device used in conjunction with a wood screw or lag screw for fastening a sheet to a wooden frame piece.

As hereinbefore indicated, the invention is adaptable for use for many different purposes and with various types of fasteners. One important embodiment and use of the invention is shown in Figures 1, 2 and 6 where two overlapping corrugated sheets 15 and 16 are fastened together and to a supporting sub-structure of beams, channel or angle irons, designated by the numeral 17. The structural sheets 15 and 16 may be of metal or of asbestos-cement, or of any other suitable composition that is used to make cover sheets for roofs, sidings or partitions in structures of the type herein contemplated. The sheets may, of course, be flat rather than being corrugated as illustrated in the drawing. When corrugated sheets are used, it is customary to locate the fastener through the crest of a corrugation as is shown in Figure 2.

The corrugated sheets are shown as fastened to the beam 17 by means of a threaded bolt 18 and a clip 19 having a bent leg portion engaging the beam 17. The clip 19 may be of other designs than that illustrated, its purpose being to provide a simple connection between the bolt 18 and the supporting sub-structure. The clip illustrated in Figures 1 and 2 is similar to that disclosed in U. S. Patent No. 2,253,916. It does not constitute my invention, per se, and since its function and the details of its construction are well understood by those skilled in the art, a further description thereof is considered to be unnecessary for the purposes of this specification. The fastener of this invention may, of course, be used without employing a clip between the bolt and the sub-structure, as will appear hereinafter.

Before the bolt 18 is inserted in the holes 20 in sheets 15 and 16, it is fitted with sealing means including a base or washer 21 that spaces the head of the bolt from the outer rim of the hole 20. As best shown in Figures 4 and 5, around the center hole 22 of the washer is a plurality of projections 23 providing radial grooves 24 between adjacent projections. The top surface of each of the projections 23 lies in the same plane as that of the other projections, said plane being parallel to the base of the washer, thus providing an abutting surface for the head of the bolt when the bolt is tightened on the clip 19, as with the nut 25a.

Around the rim of the washer and on the same side of the base thereof as the projections 23 is a flange or annular side wall 25 of greater height than said projections. The flange 25 is radially spaced from the projections to provide a groove 26 between the flange and the projections. The groove 26 communicates with the radial grooves 24. The washer constitutes a cup-like container with which cooperates a cap 28 to provide a receptacle for holding a sealing compound such as roofing putty. The cap has an annular flange or skirt 1 of larger diameter than said side wall of the washer or base and is telescopically fitted thereover with a substantial space between said skirt and said side wall; the length of said skirt and the height of said side wall providing a space within the cap and a space within the cup-like container, respectively, of such volume that when a plastic sealing compound is placed in the cap and the cap is telescopically associated with the washer, the cap and washer form a receptacle for said sealing compound and as the cap is forced over the washer the volume of said receptacle is diminished and pressure is exerted on the sealing compound to extrude said sealing compound outwardly from said receptacle through the space between said skirt and said side wall of the washer and through the grooves 24 into the hole 22.

In use of the invention, the bolt is turned from the head thereof for example with a screwdriver, while the clip 19 and nut 25 are held, until the desired tightness is obtained. Then the cap 28 is partially filled with the sealing compound and pressed onto the washer. This action causes the sealing compound to flow from the receptacle of the washer into the holes 20 in the sheets 15 and 16. As the cap is forced down over the side wall of the washer, the receptacle in the washer is filled and the excess sealing compound causes resistance to the forcing of the cap over the washer; then further application of pressure to the cap extrudes the sealing compound through the passages 24 or 38 into all openings or space around the bolt and down at least a portion of the length of the bolt in the space between the bolt and the walls of the holes 20 in the sheets 15 and 16. The holes 20 are somewhat larger in diameter than is the bolt 18 so that when a proper amount of sealing compound is used it will be pushed down through the full length of the holes 20, thereby forming a leak proof seal of maximum length between the bolt and the sheets 15 and 16. At the same time, some of the plastic sealing compound is forced outwardly between the flange of the cap and the side wall of the washer into any cracks or crevices between the washer and the surface on which it seats. If desired the sealing compound may be placed in the washer before the cap is applied to the washer.

To increase the strength of the washer and to provide a maximum abutting area for the head of the bolt against the top of the projections 23, I may make the center hole 22 of the washer only large enough to accommodate the threaded portion of the bolt. In such case, and in order to provide a passageway for the sealing compound to flow through the center hole 22 and around the bolt, the stem of the bolt is cut away adjacent the head thereof to form an annular groove 30 of a width greater than the combined thickness of the projections 23 and the base of the washer.

When the fastener of my invention is employed for fastening corrugated sheets, the base of the washer may be flat as shown in Figures 1, 2 and 6, in which case the bottom surface does not lie flat against the curved surfaces of the corrugations, as is clearly shown in Figure 2. The washer bears against only the crest of the corrugation, leaving a space 31 on each side of the corrugation under the washer. However, a modification of the washer is shown in Figure 13 where the washer 40 has a curved bottom surface 41 to nicely conform to and seat on the crest of the corrugation. With both forms of the washer, it is desirable to seal the joint between the washer and the surface with which the washer contacts, and this may be accomplished, according to the invention, by making the cap 28 somewhat larger in diameter than the washer 21, whereby the sealing compound will be forced down by the cap along the outer surface of the upright flange 25 of the washer and then into all cracks or crevices between the washer and the surface on which it seats. The sealing compound will also enter the spaces 31 from the center hole 22 of the washer.

In the modification shown in Figures 7 to 11 inclusive, the washer 34 comprises a flat circular base 35 with a center hole 36 for the bolt 18, and an upright flange 37 around the rim of the base. In this modification the washer does not have any of the projections 23 which as stated above provide passageways for the sealing compound to enter the holes in the sheeting material. In the presently described embodiment the head of the bolt lies flat against the base 35 and the passageways for the sealing compound consist of the holes 38 in said base and arranged adjacent to the flange 37. When the cap 28 is pushed down over the washer 34, the sealing compound will flow through the holes 38 and under the washer in the spaces 39 provided by the curvature of the corrugations in the sheeting material. From the spaces 39 the sealing compound will flow into the bolt holes in the sheeting material to form the desired leakproof seal.

I have included Figure 12 in the drawing to illustrate the use of the invention with a relatively long bolt 50 and a J-type clip 51 which is adapted to fasten on the lower leg of a channel bar 52 that forms part of a supporting sub-structure.

As will appear from Figure 13 of the drawings, the shape of the bottom surface of the washer can be widely varied to accommodate different contours of surfaces on which the washer must rest, Figure 13 showing the washer 40 as having the surface 41 approximately cylindrically curved in one direction to nicely seat on the crest of a corrugation of an asbestos cement roofing or siding seat. In this form of the invention, the washer is in general the same as that shown in Figures 1 to 5 inclusive, the main difference being that in Figure 13 the washer has three projections 42 instead of the six projections 23.

Figure 14 shows another use of the invention wherein a bolt fastens two flat sheets 43 directly to a frame piece 44, such as a wooden sheathing, the bolt shank 45 passing through openings 43a in the sheets 43 and the head 46 of the bolt being arranged within a washer 47 which may be identical with the washer 40 shown in Figure 13 and having the head 46 of the bolt seated on the projections on the bottom wall of the washer. A cap 48 identical with the cap 28 is telescopically fitted over the washer with the plastic sealing composition 49 enclosed in the receptacle formed by the washer and the cap, some of which extends into the openings 45 around the shank 43 of the bolt.

Figure 15 shows another use of the sealing device of the invention in connection with the nut 50 of a bolt 51 that is mounted in an opening 52 in for example a brick wall 53. The bolt 51 may be an expansion bolt or a screw anchor and is shown as utilized for securing a bracket 54 on the wall 53. The nut 50 seats on the projections on the bottom wall of the washer 55 which is shown as identical with the washer 40, and a cap 56 identical with the cap 28 coacts with the washer and the sealing composition 57 in the same way as hereinbefore described.

In Figure 16, a modification of the sealing device is shown as used in conjunction with a bolt 58 which sustains a heavy load. The base or washer 59 preferably will be made of steel to withstand the pressure and the bottom wall thereof will be flat instead of grooved or formed with projections so as to provide a firm seat for the head of the bolt. A modified cap 60 coacts with the flange of the washer in the same manner as hereinbefore described but has an enlarged annular rabbet 61 at the rim of its flange to retain a substantial quantity of the sealing composition 62, the seal in this case occurring solely at the joint between the washers 59 and the surface 63 on which the washer is seated.

As above indicated, the sealing device can be used with all types of fasteners having shanks and projecting portions such as heads or nuts, and Figure 17 shows the sealing device used with a steel sheet metal screw 64 that is utilized for securing together two metal sheets 65. The washer 66 may be the same as the washer 40 and one of the sheets has a hole 67 in register with the hole in the washer to loosely receive the shank of the screw. A cap 68 coacts with the washer in the same manner as hereinbefore described to force the sealing composition into the space between the shank of the screw and the wall of said openings.

The sealing device may also be used in conjunction with a wood screw or lag screw, for example as shown in Figure 18 where a wood screw 70 is shown as fastening a sheet of material to a wooden frame piece 72. The washer 73 and cap 74 may be identical with the washer 66 and cap 68, and the sheet 71 has an opening 75 to loosely receive the shank of the screw and into which the sealing composition 76 is forced when the cap 74 is applied.

From the above description it will be seen that the sealing device of the invention provides a fluid tight seal around the head, nut or other projecting portion on the shank of a fastener and also ensures a complete sealing of the space between the fastener shank and the wall of the hole in which said shank is located. Furthermore, the device provides a complete seal of the joint between the washer and the surface against which the washer abuts. The fastener may be tightened from the top side and only the washer need be threaded on the fastener so that installation of the sealing device can be effected economically and rapidly. When the fastener and sealing device have been set in place, the metal cap protects the sealing compound from the action of the elements and from breaking or being knocked out of place, for example by ice slides on a roof. All parts of the fastener and sealing device, except the outside of the cap, being protected from weather conditions, electrolysis such as occurs between dissimilar metals, for example iron brackets and brass bolts, is prevented. The seal produced by the invention is complete and long-lasting and the sealing device is simple in construction and can be installed by relatively unskilled workers.

While several embodiments of the invention and several different uses of the invention have been illustrated and described, it should be understood that this is primarily for the purpose of illustrating the principles of the invention and that the construction of the sealing device may be widely varied and the device may be used for many other purposes, all within the spirit and scope of the invention.

To avoid circumlocution, the word "head" is used in the appended claims to include the integral or rigid head, nut or other projection on the head of the shank or a bolt, screw or other fastener element.

I claim:

1. A sealing device for a fastener having a shank to be inserted into an opening in a structure and a head on said shank, said sealing device comprising a washer having a bottom wall to abut a surface of said structure around said opening and providing a seat for said head and having a hole to accommodate said shank, said washer having a continuous annular side wall upstanding therefrom, and a cap including a continuous skirt slidably telescopically fitted over said side wall of the washer, the length of the skirt and the height of said side wall providing a space within the cap and a space within said washer, respectively, of such volume that when a plastic sealing compound is placed in the cap and the cap is telescopically associated with the washer the cap and washer form a receptacle for said sealing compound, and as the cap is forced over the washer the volume of said receptacle is diminished and pressure is exerted on the sealing compound, there being passages from said receptacle through which said sealing compound under said pressure is extruded into surrounding relation to said fastener and into contact with said surface of said structure.

2. A sealing device as defined in claim 1 wherein said skirt is substantially spaced from said annular side wall of the washer to form a passage for said sealing compound from said receptacle.

3. A sealing device as defined in claim 1 wherein said passages include holes through said bottom wall of the washer.

4. A sealing device as defined in claim 1 wherein said passages include grooves on the inner side of said bottom wall leading to said hole in the washer.

5. A sealing device as defined in claim 1 wherein certain of said passages are formed by a plurality of upstanding projections around said hole in the bottom wall of the washer providing an abutting surface for said head of said fastener, said projections being spaced from each other and providing a groove between each pair of adjacent projections opening into and extending radially from said hole in said bottom wall distances greater than the diameter of said head, whereby when the fastener head lies against the top surfaces of said projections, the spaces between the projections constitute passageways providing connections between the interior of said receptacle and said hole in the bottom wall of the washer.

6. In a structural assembly comprising sheet material secured to a supporting sub-stucture in which sheet material there is a hole, a bolt extending through said hole and having a head, a washer comprising a bottom wall abutting one side of said sheet material and having an upstanding continuous side wall, said bottom wall providing a seat for said head and having a hole through which passes said shank, said hole being of a diameter greater than the adjacent portion of the shank, and a cap including a continuous annular skirt telescopically associated with said side wall of the washer, the cap and washer providing between them a receptacle and there being passages from said receptacle to said hole in the bottom wall of the washer, and a plastic sealing compound completely filling said receptacle and said passages and extending into the space between said shank and the wall of said hole in the sheet material in surrounding relation to said shank, and means connecting the shank of the bolt to said sub-structure.

7. In a structural assembly comprising sheet material secured to a supporting sub-structure in which sheet material there is a hole, a bolt extending through said hole and having a head, a washer comprising a bottom wall abutting one side of said sheet material and having an upstanding continuous side wall, said bottom wall providing a seat for said head and having a hole through which passes said shank, said hole being of a diameter greater than the adjacent portion of the shank, said bottom wall and annular side wall of the washer forming a container and there being passages leading from said container to said hole in the bottom wall of the washer, and a plastic sealing compound filling said container and said passages and extending into the space between said shank and the wall of said hole in said sheet material in surrounding relation to said shank, and means connecting the shank of the bolt to said substructure.

References Cited in the file of this patent

UNITED STATES PATENTS

| | | |
|---|---|---|
| 314,075 | Staunton | Mar. 17, 1885 |
| 1,083,876 | Craig | Jan. 6, 1914 |
| 1,805,937 | Berge | May 19, 1931 |
| 1,967,841 | Perry | July 24, 1934 |

FOREIGN PATENTS

| | | |
|---|---|---|
| 231,366 | Great Britain | Apr. 2, 1925 |
| 459,202 | Germany | Apr. 5, 1928 |
| 420,109 | Great Britain | Nov. 26, 1934 |
| 578,357 | Great Britain | June 25, 1946 |